United States Patent [19]
Courter et al.

[11] Patent Number: 6,125,370
[45] Date of Patent: *Sep. 26, 2000

[54] REPARTITIONING DATA

[75] Inventors: Daniel Keith Courter, Antioch; Paramesh Sampatrai Desai; Craig Alan Friske, both of San Jose; John Marland Garth, Gilroy; Kevin Daniel Gougherty, Fremont; Laura Michiko Kunioka-Weis, Morgan Hill; David Elmer Raiman, San Jose; James Alan Ruddy, Gilroy; Julie Ann Watts, Morgan Hill; Kathryn Ruth Zeidenstein, San Jose, all of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 09/053,246

[22] Filed: Apr. 1, 1998

[51] Int. Cl.⁷ ................................................ G06F 17/00
[52] U.S. Cl. .......................... 707/202; 707/3; 707/5; 707/8; 707/10; 707/102; 707/200
[58] Field of Search .................... 707/200–204, 707/5, 8, 7, 3, 10, 102, 202

[56] References Cited

U.S. PATENT DOCUMENTS

| | | | |
|---|---|---|---|
| 5,237,678 | 8/1993 | Kuechler et al. | 395/600 |
| 5,285,528 | 2/1994 | Hart | 395/725 |
| 5,448,727 | 9/1995 | Annevelink | 707/1 |
| 5,457,797 | 10/1995 | Butterworth et al. | 395/650 |
| 5,459,864 | 10/1995 | Brent | 395/650 |
| 5,553,285 | 9/1996 | Krakauer et al. | 395/600 |
| 5,625,811 | 4/1997 | Bhide et al. | 395/602 |
| 5,701,467 | 12/1997 | Freeston | 707/100 |
| 5,721,915 | 2/1998 | Sockut et al. | 707/200 |
| 5,742,806 | 4/1998 | Reiner et al. | 707/1 |
| 5,893,086 | 4/1999 | Schmuck | 707/1 |
| 6,003,036 | 12/1999 | Martin | 707/102 |
| 6,026,412 | 2/2000 | Sockut et al. | 107/200 |

FOREIGN PATENT DOCUMENTS

| | | |
|---|---|---|
| 2159269 | 3/1997 | Canada . |
| WO 97/04384 | 6/1997 | WIPO . |

OTHER PUBLICATIONS

IBM Technical Disclosure Bulletin, vol. 38, No. 06, Jun. 1995, p. 557.
IBM Technical Disclosure Bulletin, vol. 39, No. 01, Jan. 1996, pp. 65–68.
IBM Technical Disclosure Bulletin, vol. 40, No. 01, Jan. 1997, pp. 157–160.

*Primary Examiner*—Thomas G. Black
*Assistant Examiner*—Diane Mizrahi
*Attorney, Agent, or Firm*—Pretty, Schroeder & Poplawski

[57] ABSTRACT

A method, apparatus, and article of manufacture for a computer-implemented repartitioning system. Data is repartitioned in a database stored on a data storage device connected to a computer. First, it is detected that a partitioning scheme for the data has been altered. Next, partitions that would be affected by the altered partitioning scheme are identified. Then, the identified partitions are reorganized based on the altered partitioning scheme.

27 Claims, 3 Drawing Sheets

REPARTITIONING DATA

CROSS-REFERENCE TO RELATED APPLICATION

This application is related to the following copending and commonly-assigned patent application:

U.S. pending application Ser. No. 09/053,356, entitled "REBALANCING PARTITIONED DATA," filed on same date herewith, by James A. Ruddy, et al., attorney's docket number ST9-97-091, which is incorporated by reference herein.

BACKGROUND OF THE INVENTION

1. Field of the Invention

This invention relates in general to computer-implemented database systems, and, in particular, to repartitioning data in a database.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. The tables are typically stored on direct access storage devices (DASD), such as magnetic or optical disk drives for semi-permanent storage.

A table can be divided into partitions, with each partition containing a portion of the table's data. By partitioning tables, the speed and efficiency of data access can be improved. For example, partitions containing more frequently used data can be placed on faster data storage devices, and parallel processing of data can be improved by spreading partitions over different DASD volumes, with each I/O stream on a separate channel path. Partitioning also promotes high data availability, enabling application and utility activities to progress in parallel on different partitions of data.

Data may be distributed among partitions by a variety of schemes ("partitioning schemes"). One partitioning scheme assigns data to partitions according to a boundary value present in specified columns of the data row. The boundary value is the data value that separates each partition from the next partition. In one database system, the DB2® product offered by International Business Machines Corporation, Armonk, New York, a range of values is associated with each table partition by means of a CREATE INDEX statement. The CREATE INDEX statement gives the boundary value for each partition.

As records are added or removed from a partitioned table, the size of the partitions change. Over time, partitions can become unbalanced, with each partition containing widely different amounts of data. Parallel operations are less efficient when partitions are unevenly sized than when they are balanced in size. Moreover, sometimes a problem occurs with the size of the partitions because a database administrator who identified ranges for the partitions did not make an optimal selection, leaving the partitions unbalanced initially. The partitions could be rebalanced manually by a database administrator with a lot of effort, but this is time consuming and inefficient.

Additionally, rebalancing a subset of a table's partitions can result in all the table's partitions being unavailable to other applications. Finally, recovery of one or more partitions to a point in time prior to a manual rebalancing can result in data integrity problems.

Therefore, there is a need in the art for an improved method of repartitioning and balancing data.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented repartitioning system.

In accordance with the present invention, data is repartitioned in a database stored on a data storage device connected to a computer. First, it is detected that a partitioning scheme for the data has been altered. Next, partitions that would be affected by the altered partitioning scheme are identified. Then, the identified partitions are reorganized based on the altered partitioning scheme.

An object of the invention is to enable partitioning schemes for one or more tables to be changed. Another object of the invention is to enable data to be shifted among the partitions based on the changed partitioning scheme. Yet another object of the invention is to restrict access only to the partitions being repartitioned.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
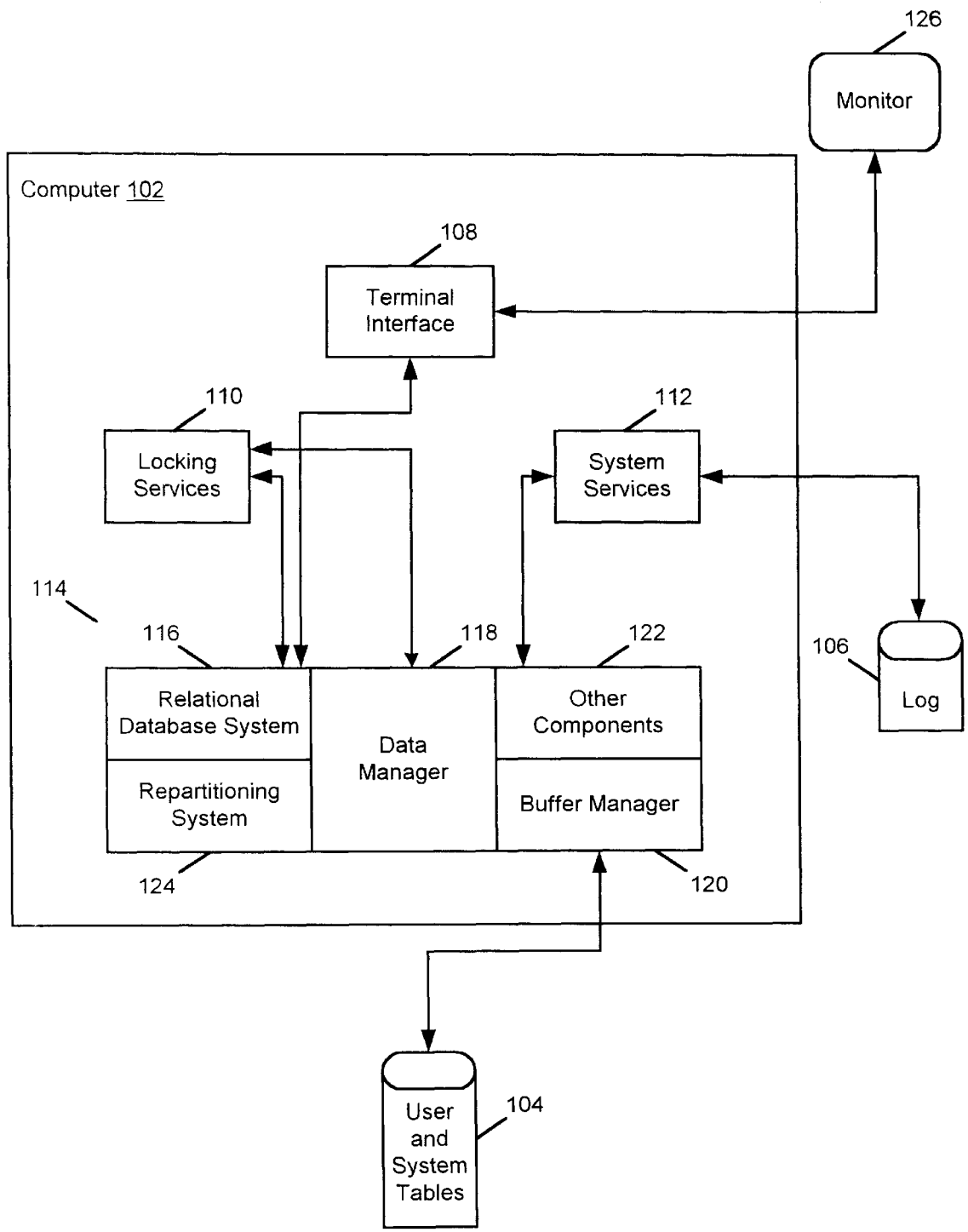
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, OS/390@, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. RDBMS software using a Structured Query Language (SQL) interface is well known in the art.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In a preferred embodiment of the present invention, the RDBMS software comprises the DB2® product offered by IBM for the MVS® or OS/390® operating systems. Those skilled in the art will recognize, however, that the present invention has application to any RDBMS software, whether or not the RDBMS software uses SQL.

As illustrated in FIG. 1, the DB2® system for the MVS® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Repartitioning System 124, and other components 122 such as an SQL compiler/interpreter. These submodules support the functions of the SQL language, i.e. definition, access control, interpretation, compilation, database retrieval, and update of user and system data. The Repartitioning System 124 works in conjunction with the other submodules to repartition data.

The present invention is generally implemented using SQL statements executed under the control of the Database Services module 114. The Database Services module 114 retrieves or receives the SQL statements, wherein the SQL statements are generally stored on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in and/or readable from a computer-readable medium, e.g. one or more of the data storage devices 104 and 106. Moreover, the RDBMS software, the SQL statements, and the instructions derived therefrom, are all comprised of instructions which, when read and executed by the computer system 102, cause the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Repartitioning Data

The repartitioning system 124 provides a technique for altering a partitioning scheme for data in a partitioned database. In one embodiment, the repartitioning system 124 enables a user to redefine one or more limiting boundary values ("limit keys") for one or more corresponding partitions. A limit key indicates the maximum key value that is allowed in that partition.

A range of values is associated with each table partition by means of a CREATE INDEX statement. A user creates an index for a partitioned table, called a partitioning index. The index is based on one or more columns of the table and is used to define the scope of each partition and, thereby, assigns rows of the table to their respective partitions.

The following pseudocode provides an example of a CREATE INDEX statement:

CREATE INDEX COLUMN <column ID>, COLUMN
      <column ID>
      <PART <integer>><LIMIT KEY <key>>;
      <PART <integer>><LIMIT KEY <key>>;

The COLUMN fields specify index columns, which are the partition values. The PART options specify limit keys, using the LIMIT KEY options. The limit keys are the range values for the partitions. In standard SQL today, only a maximum range value is specified. In this embodiment, the limit keys may be in ascending or descending order, and all limit keys must be in the same order.

A user redefines a limit key by altering an index and specifying a boundary value for each of the partitions specified in an ALTER INDEX statement. The following pseudocode provides an example of an ALTER INDEX statement:

ALTER INDEX <index name>
      <PART <integer>>
      <LIMIT KEY <key>>;

The ALTER INDEX statement enables a user to alter different aspects of an indexspace containing an index. For example, a user can specify a particular index by providing an "index name", specify a partition with the PART option, and change a limit key with the LIMIT KEY option. The LIMIT KEY statement can be repeated, allowing for the changing the limit keys for multiple partitions with one statement.

Once the limit key is altered, the repartitioning system 124 identifies the partitions that are affected by the altered limit key. Typically, the partitions that are affected are neighboring partitions, and, in particular, each partition succeeding the partition whose limit key has been altered. For example, if the limit key for partition 3 were altered, the repartitioning system 124 would identify partition 3 and partition 4 as being affected by the altered limit key. When the limit key of the last partition is altered to a higher value, the repartitioning system does not have to rebalance the data, therefore, this partition is not placed in a restrictive state.

When a partition's boundary value is changed, the repartitioning system 124 places the partition and any partition affected by the boundary change (e.g., in the preferred embodiment, the next higher partition, if any) in a state that restricts access to the data in the partition (i.e., in a "restricted state"). While in the restricted state, the partitions can not be read or updated (i.e., "accessed"). However, the unaffected partitions are not placed in the restricted state, leaving them available for use. The repartitioning system 124 maintains the affected partitions in the restricted state until the data that is violating the new boundary values is moved to the correct partition or discarded. Data is discarded when the limit key of the last partition is altered to a lower value. In particular, the repartitioning system 124 discards the data whose keys are higher than the new limit key value for the index. The discarded data is placed in a discarded data set, which the user can dispose of.

The data in the affected partitions is reorganized, for example, using a REORG facility such as one that is available with a DB2® product. Because the rebalancing of data is limited to the affected partitions, the repartitioning system 124 provides a technique for rebalancing a subset of partitions without restricting access to unaffected partitions. For example, if partition 3 and partition 4 are being rebalanced, then partition 1 and partition 2 are unaffected. The repartitioning system 124 repartitions data by a reorganization of all partitions that are in the restricted state. Records in the partitions are moved to the correct partition or discarded if they no longer belong in any of the partitions due to the altered limit keys. Once the reorganizing is completed, the repartitioning system 124 removes the restricted state for the affected partitions.

Figure 2:
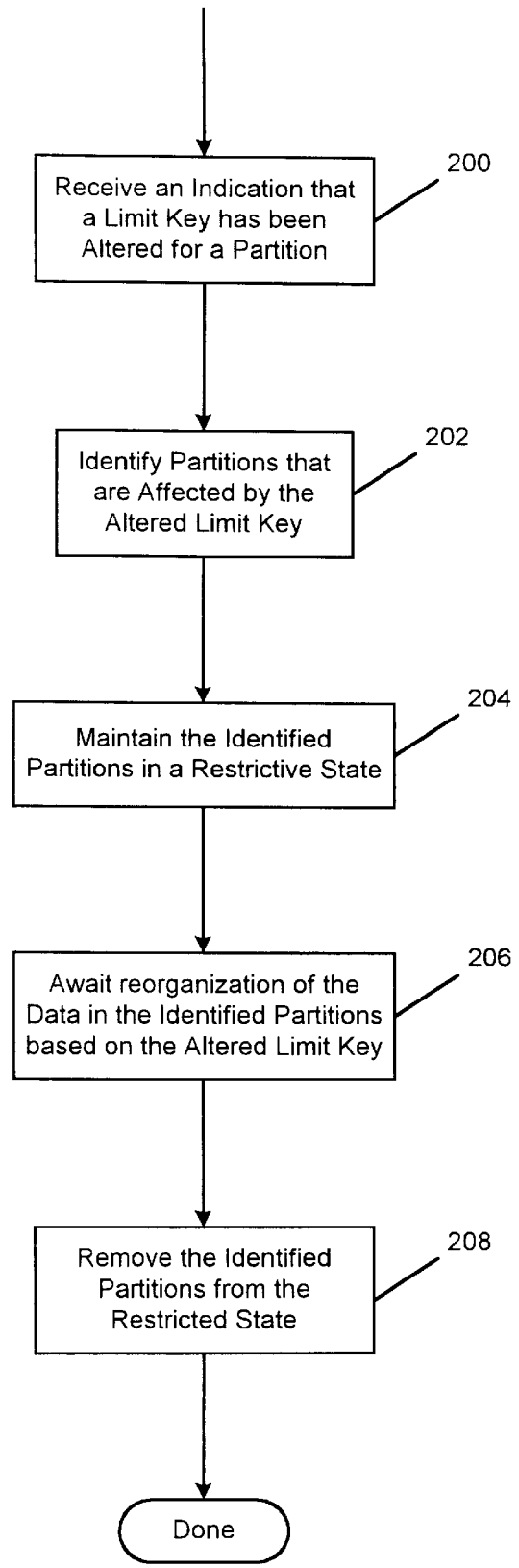
FIG. 2 is a flow diagram illustrating the steps performed by the repartitioning system to repartition a database object.

FIG. 2 is a flow diagram illustrating the steps performed by the repartitioning system 124 to repartition a database object. In Block 200, the repartitioning system 124 receives an indication that a limit key has been altered for a partition. In Block 202, the repartitioning system 124 identifies partitions that are affected by the altered limit key. In Block 204, the repartitioning system 124 maintains the identified partitions in a restrictive state. In Block 206, the repartitioning system 124 awaits reorganization of the data in the identified partitions based on the altered limit key. In Block 208, the repartitioning system 124 removes the identified partitions from the restricted state.

The repartitioning system 124 also provides a technique to handle data recovery to a point in time prior to the reorganization without loss of data integrity. The repartitioning system 124 maintains special recovery records, for example, in a system catalog, to identify the partitions that were involved in a reorganization of data due to altered limit keys. If a user attempts to recover a subset of the set of reorganized partitions to a point in time prior to the reorganization, the repartitioning system 124 prohibits the recovery. In particular, if two partitions have been reorganized, and a user attempts to recover only one of those partitions, the operation is prohibited to prevent degrading the integrity of the data in the partitions.

On the other hand, if a user recovers all of the reorganized partitions to a point in time prior to the reorganization, the repartitioning system 124 allows the recovery. In particular, the repartitioning system 124 performs the recovery by copying a previously stored version of the partition data to the partitions and then applying modifications to the data that have been logged in a log file. After applying the modifications to the data, the repartitioning system 124 places the partitions affected by the boundary value changes into a restricted state. Placement of these partitions in a restricted state alerts a user that the partitions should be reorganized, with, for example, a utility, to organize the data in the partitions according to the changed boundary values, which are stored by the repartitioning system 124.

Figure 3:
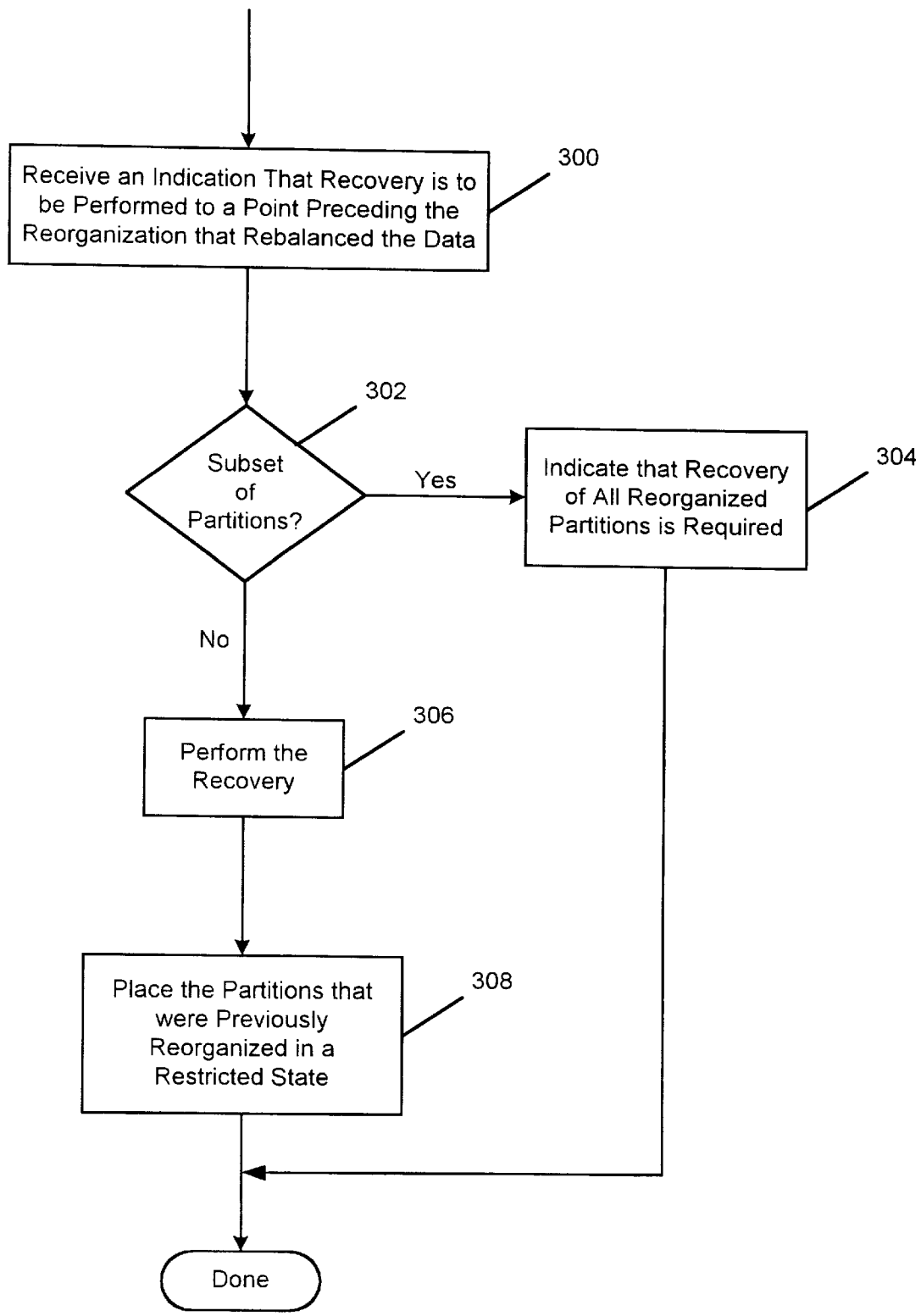
FIG. 3 is a flow diagram illustrating the steps performed by the repartitioning system upon receiving a recovery operation.

FIG. 3 is a flow diagram illustrating the steps performed by the repartitioning system 124 upon receiving a recovery operation. In Block 300, the repartitioning system 124 receives an indication that recovery is to be performed to a point preceding the reorganization that rebalanced the data. In Block 302, the repartitioning system 124 determines whether the recovery is for a subset of reorganized partitions. If the recovery is for a subset, the repartitioning system 124 continues to Block 304, otherwise, the repartitioning system 124 continues to Block 306. In Block 304, the repartitioning system 124 indicates that recovery of all reorganized partitions is required. In Block 306, the repartitioning system 124 performs recovery. In Block 308, the repartitioning system 124 places the partitions that were previously reorganized in a restricted state.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for a computer-implemented repartitioning system. The present invention enables partitioning schemes for one or more tables to be changed. The present invention also enables data to be shifted among the partitions based on the changed partitioning scheme. Moreover, the present invention restricts access only to the partitions being repartitioned.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of repartitioning data in a database stored on a data storage device connected to a computer, the method comprising the steps of:

detecting that a partitioning scheme for the data has been altered when a partitioning index is altered, which specifies one or more partitions and a limit key for each partition, wherein the limit key defines a range of values for a partition;

identifying adjacent partitions that would be affected by the altered partitioning scheme;

restricting access to each of the identified partitions without restricting access to other partitions; and reorganizing the identified partitions based on the altered partitioning scheme, by moving data between the identified partitions while allowing access to other partitions.

2. The method of claim 1, wherein the adjacent partition is a succeeding partition.

3. The method of claim 1, further comprising the step of maintaining the identified partitions in a restricted state.

4. The method of claim 3, further comprising the step of restricting access to each of the identified partitions in the restricted state.

5. The method of claim 3, further comprising the step of, after reorganizing, removing each of the identified partitions from the restricted state.

6. The method of claim 1, wherein the step of reorganizing further comprises the step of discarding data that no longer belongs in any of the partitions.

7. The method of claim 1, further comprising the steps of:

detecting that recovery of one or more partitions is to be performed to a point preceding the step of reorganizing the data;

determining that all of the reorganized partitions are to be recovered; and performing the recovery.

8. The method of claim 7, further comprising the step of placing the partitions affected by the altered partitioning scheme in a restricted state.

9. The method of claim 1, further comprising the steps of:

detecting that recovery of one or more partitions is to be performed to a point preceding the step of reorganizing the data;

determining that not all of the reorganized partitions are to be recovered; and preventing recovery of the partition.

10. An apparatus for repartitioning data in a database, comprising:

a computer having a data storage device connected thereto, wherein the data storage device stores a database;

one or more computer programs, performed by the computer, for detecting that a partitioning scheme for the data has been altered by a limit key, wherein the limit key defines a range of values for a partition, identifying the partitions that would be affected by the altered partitioning scheme, and reorganizing the identified partitions based on the altered partitioning scheme, by moving data between the identified partitions.

11. The apparatus of claim 10, wherein the adjacent partition is a succeeding partition.

12. The apparatus of claim 10, further comprising the means for maintaining the identified partitions in a restricted state.

13. The apparatus of claim 12, further comprising the means for restricting access to each of the partitions in the restricted state.

14. The apparatus of claim 12, further comprising the means for, after reorganizing, removing each of the identified partitions from the restricted state.

15. The apparatus of claim 10, wherein the means for reorganizing further comprises the means for discarding data that no longer belongs in any of the partitions.

16. The apparatus of claim 10, further comprising:

means for detecting that recovery of one or more partitions is to be performed to a point preceding the reorganization of the data;

means for determining that all of the reorganized partitions are to be recovered; and means for performing the recovery.

17. The apparatus of claim 16, further comprising the means for placing the partitions affected by the altered partitioning scheme in a restricted state.

18. The apparatus of claim 10, further comprising:

means for detecting that recovery of one or more partitions is to be performed to a point preceding the reorganization of the data;

means for determining that not all of the reorganized partitions are to be recovered; and means for preventing recovery of the partition.

19. An article of manufacture comprising a computer program carrier readable by a computer and embodying one or more instructions executable by the computer to perform the method steps for repartitioning data in a database stored in a data storage device connected to the computer, the method comprising the steps of:

detecting that a partitioning scheme for the data has been altered when a partitioning index is altered, which specifies one or more partitions and a limit key for each partition, wherein the limit key defines a range of boundary values for a partition;

identifying adjacent partitions that would be affected by the altered partitioning scheme;

restricting access to each of the identified partitions without restricting access to other partitions; and reorganizing the identified partitions based on the altered partitioning scheme, by moving data between the identified partitions while allowing access to other partitions.

20. The article of manufacture of claim 19, wherein the adjacent partition is a succeeding partition.

21. The article of manufacture of claim 19, further comprising the step of maintaining the identified partitions in a restricted state.

22. The article of manufacture of claim 21, further comprising the step of restricting access to each of the partitions in the restricted state.

23. The article of manufacture of claim 21, further comprising the step of, after reorganizing, removing each of the identified partitions from the restricted state.

24. The article of manufacture of claim 19, wherein the step of reorganizing further comprises the step of discarding data that no longer belongs in any of the partitions.

25. The article of manufacture of claim 19, further comprising the steps of:

detecting that recovery of one or more partitions is to be performed to a point preceding the step of reorganizing the data;

determining that all of the reorganized partitions are to be recovered; and performing the recovery.

26. The article of manufacture of claim 25, further comprising the step of placing the partitions affected by the altered partitioning scheme in a restricted state.

27. The article of manufacture of claim 19, further comprising the steps of:

detecting that recovery of one or more partitions is to be performed to a point preceding the step of reorganizing the data;

determining that not all of the reorganized partitions are to be recovered; and preventing recovery of the partition.

* * * * *